(12) United States Patent
    Schmalenberg

(10) Patent No.: US 10,274,599 B2
(45) Date of Patent: Apr. 30, 2019

(54) LIDAR SYSTEMS WITH EXPANDED FIELDS OF VIEW ON A PLANAR SUBSTRATE

(71) Applicant: Toyota Motor Engineering & Manufacturing North America, Inc., Erlanger, KY (US)

(72) Inventor: Paul Schmalenberg, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 345 days.

(21) Appl. No.: 15/170,152

(22) Filed: Jun. 1, 2016

(65) Prior Publication Data
    US 2017/0350965 A1    Dec. 7, 2017

(51) Int. Cl.
    *G01S 17/10*    (2006.01)
    *G01S 17/42*    (2006.01)
    *G01S 17/87*    (2006.01)
    *G01S 17/89*    (2006.01)
    *G01S 7/481*    (2006.01)
    *G01S 17/88*    (2006.01)

(52) U.S. Cl.
    CPC ............ *G01S 17/10* (2013.01); *G01S 7/4812* (2013.01); *G01S 7/4813* (2013.01); *G01S 7/4817* (2013.01); *G01S 17/42* (2013.01); *G01S 17/87* (2013.01); *G01S 17/88* (2013.01); *G01S 17/89* (2013.01)

(58) Field of Classification Search
    CPC .......... G01S 17/10; G01S 17/42; G01S 17/87; G01S 17/88; G01S 17/89; G01S 7/4812; G01S 7/4813; G01S 7/4817
    See application file for complete search history.

(56) References Cited

U.S. PATENT DOCUMENTS

| | | | |
|---|---|---|---|
| 6,469,834 B1 * | 10/2002 | Shahzad | G02B 3/0056 355/67 |
| 6,836,285 B1 | 12/2004 | Lubard et al. | |
| 7,534,984 B2 | 5/2009 | Gleckler | |
| 7,544,945 B2 * | 6/2009 | Tan | G01S 7/4811 180/169 |

(Continued)

FOREIGN PATENT DOCUMENTS

WO    2004/065984 A1    8/2004

*Primary Examiner* — Eric L Bolda
(74) *Attorney, Agent, or Firm* — Dinsmore & Shohl LLP

(57) ABSTRACT

A Lidar system configured to have a wide field of view. The LIDAR system includes a substrate. The substrate is planar. An array of electronic laser scan transceiver chips are mounted to the substrate. An lenslet array is spaced apart from the array of electronic laser scans transceivers so as to increase the field of the array of electronic laser scan transceiver chips. A plurality of baffles extend between the array of electronic laser scan transceiver chips and the lenslet array so as to separate the electronic laser scan transceiver chips and the lenslets from each other. The baffles provide structural support for the lenslet array and are further configured to absorb scatter from the laser beams transmitted and received by respective electronic laser scan transceiver chips. Accordingly, the Lidar system increases the field of view of the individual electronic scan transceivers without complicating the manufacturing process relative to Lidar systems with convex substrates.

20 Claims, 5 Drawing Sheets

(56) References Cited

U.S. PATENT DOCUMENTS

| | | | |
|---|---|---|---|
| 9,322,901 B2* | 4/2016 | Kerness | G01S 17/026 |
| 2005/0072907 A1* | 4/2005 | Pallaro | G01J 1/4228 |
| | | | 250/215 |
| 2006/0044451 A1* | 3/2006 | Liang | H04N 5/3415 |
| | | | 348/340 |
| 2006/0132752 A1* | 6/2006 | Kane | G01S 7/4817 |
| | | | 356/5.02 |
| 2006/0215054 A1* | 9/2006 | Liang | G02B 3/0056 |
| | | | 348/337 |
| 2006/0231771 A1* | 10/2006 | Lee | G01N 21/645 |
| | | | 250/458.1 |
| 2007/0096010 A1* | 5/2007 | Pallaro | B60R 1/00 |
| | | | 250/208.1 |
| 2010/0013857 A1* | 1/2010 | Fleet | G09G 3/006 |
| | | | 345/629 |
| 2014/0168415 A1 | 6/2014 | Ihlenburg et al. | |
| 2015/0090884 A1* | 4/2015 | Bouchilloux | G01S 17/46 |
| | | | 250/341.8 |
| 2015/0130973 A1* | 5/2015 | Saito | G02B 3/0087 |
| | | | 348/252 |
| 2015/0219764 A1 | 8/2015 | Lipson | |
| 2016/0025855 A1* | 1/2016 | Camarri | G01S 7/4816 |
| | | | 250/206.1 |

* cited by examiner

LIDAR SYSTEMS WITH EXPANDED FIELDS OF VIEW ON A PLANAR SUBSTRATE

TECHNICAL FIELD

The present specification generally relates to electronic laser scan assemblies.

BACKGROUND

Electronic laser scan assemblies, also commonly known as LIDAR systems, are used to provide three dimensional scanning of an object. LIDAR systems include an electronic laser scan transceiver chip. The electronic laser scan transceiver chip is configured to transmit and receive a laser beam. The electronic laser scan transceiver chip includes a processor and electric components configured to steer the laser beam so as to generate a predetermined field of view. However, due to current manufacturing processes the scanning function of the electronic laser scan transceiver chip is somewhat limited. Currently, electronic laser scan transceiver chips have a scanning field of view of up to thirty (30) degrees. Such a field of view may not be suitable for certain applications, such as automotive vehicle image processing applications wherein a wide field of view facilitates functions such as autonomous driving, reactive braking and steering or the like.

FIG. 1 is an embodiment of a current LIDAR system 100 having a widened field of view. Specifically, the electronic laser scan transceiver chips 102 are mounted on a substrate, referenced in this section as 104 generally and specifically as 104a, 104b, 104c. Each substrate 104 is angled relative to each other so as to form a non-planar base structure and a generally convex surface wherein the substrates 104a, 104c forming the ends of the assembly are angled so as to widen the overall field of view of the LIDAR system 100. FIG. 1 shows how each electronic laser scan transceiver chip 102 is mounted the substrate 104, and each substrate 104 is generally planar. The substrates 104 are then coupled together by a binding structure 106 wherein the planar substrates are angled relative to each other.

However, it should be appreciated that the manufacture and assembly of a LIDAR system with a convex substrate having electronic laser scan transceiver chips disposed thereon adds costs and complexity to the assembly process, relative to a LIDAR system with a planar substrate. In particular, the binding structure may require hand assembly. However, a LIDAR system with a planar substrate having electronic laser scan transceiver chips disposed thereon has a narrow field of view relative to LIDAR system with a convex substrate having electronic laser scan transceiver chips disposed thereon.

Accordingly, a need exists for a LIDAR system which is easier to assemble and manufacture relative to current LIDAR systems with a convex surface and with electronic laser scan transceiver chips having a field of view comparable to LIDAR systems with a convex substrate having electronic laser scan transceiver chips disposed thereon.

In another example of widening the field of view of a LIDAR system, a rotating polygon mirror may be utilized. However, such a system requires larger packaging space and thus may not be suitable for use in automotive vehicles, or home appliances.

Accordingly, it remains desirable to have a LIDAR system requiring packaging space suitable for use in automotive vehicles and home appliances, wherein the LIDAR system has a field of view comparable to that of a LIDAR system utilizing rotating polygon mirrors.

SUMMARY

In one embodiment, a LIDAR system includes a substrate, an array of electronic laser scan transceiver chips is mounted to the substrate. A lenslet array is spaced apart from the array of electronic laser scans transceiver chips so as to increase the field of view of the array of electronic laser scan transceiver chips. The LIDAR system further includes and a plurality of baffles. The baffles extend between the array of electronic laser scan transceiver chips and the lenslet array so as to separate the electronic laser scan transceiver chips and the lenslets from each other. The baffles provide structural rigidity to the LIDAR assembly and also shield the electronic laser scan transceiver chips from electromagnetic field generated by an adjacent electronic laser scan transceiver chips.

In one embodiment, the lenslets are aspherical and designed to have a predetermined field of view. In another embodiment, the lenslets are generally planar and are formed of a metamaterial configured to have a predetermined field of view. The LIDAR system may be configured to have a matrix of lenslet arrays. The lenslets in the matrix of lenslet arrays may be aspherical or formed of metamaterials. The matrix of lenslet arrays are disposed in front of a matrix of electronic laser scan transceiver chips so as to broaden the field of view in three dimensions. The matrix of lenslet arrays has the same number of lenslets as the number of electronic laser scan transceiver chips in the matrix of electronic laser scan transceiver chips.

In one embodiment of the LIDAR system, the LIDAR system is used in a fiber optic network. The fiber optic network includes an input fiber optic cable and a receiving bundle of fiber optic cables. The receiving bundle includes a plurality of groups, each group has a predetermined number of fiber optic cables. The LIDAR system may be used to carry data over the laser beam to predetermined groups of fiber optic cable so as to ensure that the bandwidth of the groups is not exceeded.

The input fiber optic cable is coupled to the electronic laser scan transceivers so as to transmit and receive data over the laser beam. The electronic laser scan transceivers are disposed behind a lenslet array. Each lenslet in the lenslet array is configured to transmit and receive a laser beam to and from an assigned group of fiber optic cables. The controller selectively actuates an electronic laser scan transceiver chip based upon the amount of data being transmitted in the fiber optic network. Accordingly, data may be parsed between different groups of fiber optic cables.

The LIDAR system according to the embodiments described has a planar substrate with electronic laser scan transceiver chips having a field of view comparable to LIDAR systems with a convex substrate having electronic laser scan transceiver chips disposed thereon. Such a configuration makes the assembly of the LIDAR system less complicated relative to LIDAR systems with convex surfaces. Further, the LIDAR system may be suitable for use in applications where packaging space is limited, to include communications networks or object detection systems in automotive vehicles.

BRIEF DESCRIPTION OF THE DRAWINGS

The embodiments set forth in the drawings are illustrative and exemplary in nature and not intended to limit the subject FIG. 1 schematically depicts a prior art LIDAR system having a convex substrate.

DETAILED DESCRIPTION

Figure 1:
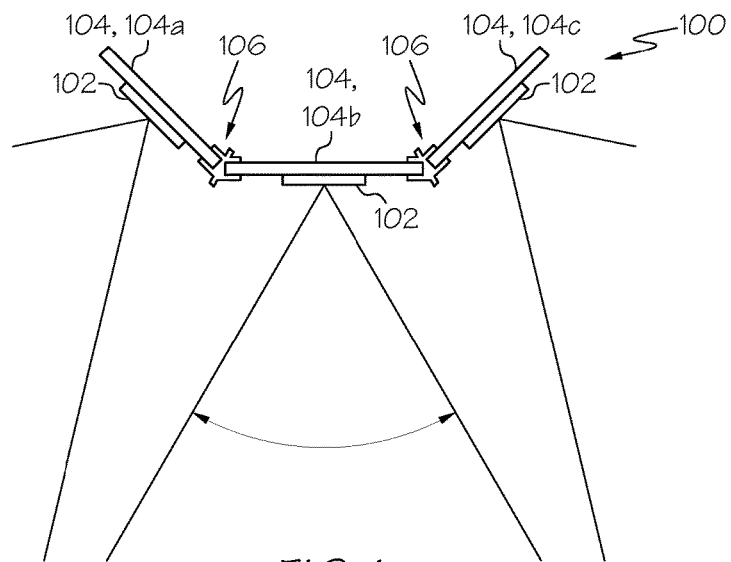

Referring generally to the figures, embodiments of the present disclosure are directed to a LIDAR system configured to have a wide field of view and to be easily assembled. The embodiments of the LIDAR system described herein are particularly useful for applications where packaging space is limited, illustratively including, but not limited to automotive vehicles, commercial office space and residential homes.

The LIDAR system includes a substrate. The substrate is planar. An array of electronic laser scan transceiver chips are mounted to the substrate. A lenslet array is spaced apart from the array of electronic laser scans transceivers so as to increase the field of the array of electronic laser scan transceiver chips. The substrate is substantially planar over multiple ones of the electronic laser scan transceiver chips and multiple ones of the lenslets. In some embodiments, the substrate may be substantially planar over the entire array of electronic laser scan transceiver chips and lenslet array.

The LIDAR system further includes a plurality of baffles. The baffles extend between the electronic laser scan transceiver chips and their associated lenslets so as to separate respective ones of the electronic laser scan transceiver chips and the lenslets from each other. The baffles provide structural rigidity to support each lenslet of the lenslet array and are further configured to absorb scatter from the laser beams transmitted and received by respective electronic laser scan transceiver chips, which can provide for more accurate imaging.

Accordingly, the LIDAR system increases the field of view of the individual electronic laser scan transceiver chips without complicating the manufacturing process relative to LIDAR systems with planar substrates coupled to each other as a non-planar base structure so as to form a generally convex surface. As used herein, the term "generally convex" refers to an outwardly extending shape where the electronic laser scan transceiver chips are located on the outwardly turned surface. Further, the LIDAR system provides a similar field of view relative to LIDAR systems utilizing rotating polygon mirrors yet, unlike LIDAR systems using rotating polygon mirrors, is suitable for use in applications where packaging space is limited.

In one embodiment, the LIDAR system may be used to provide three-dimensional mapping for automotive or home appliance applications. For instance, the LIDAR system generates a three-dimensional scan of a field of view which may be processed by the automotive vehicle to support autonomous driving, collision avoidance and the like. The LIDAR system may be used for other applications. For example, the LIDAR system can generate a three-dimensional scan of a field of view which may be processed by an autonomous vacuum cleaner or other autonomous moving device.

The LIDAR system may be used in other applications that do not require the generation of a three-dimensional scan of a field of view. For instance, in one embodiment, the LIDAR system may be used to manage data for an optical fiber communication network, wherein a processor directs the laser beam to a desired optical fiber in an optical fiber network so as to maximize data transfer to a client.

Figure 2:
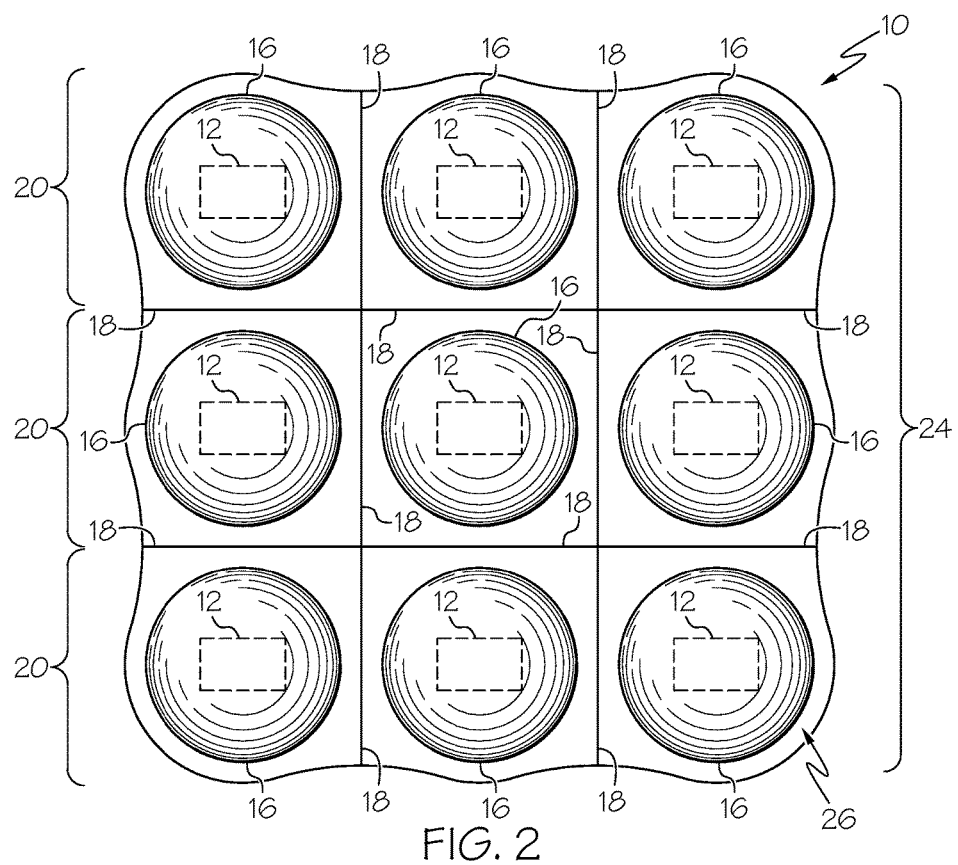
FIG. 2 schematically depicts a LIDAR system according to one or more embodiments described and illustrated herein.
Figure 4:
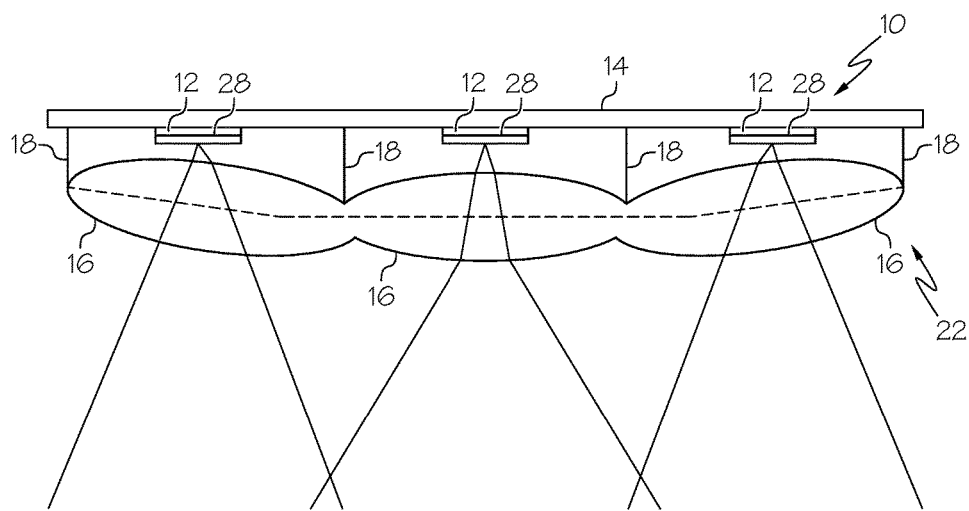
FIG. 4 is a cross-sectional view of the LIDAR system shown in FIG. 2 taken along lines 4-4.

Referring now to FIGS. 2 and 4, a LIDAR system 10 is provided. In some embodiments, the LIDAR system 10 includes an electronic laser scan transceiver chip 12. The electronic laser scan transceiver chip 12 is mounted on a first substrate 14. The first substrate 14 is generally planar forming a planar base structure for the electronic laser scan transceiver chips 12. The LIDAR system 10 further includes a lenslet 16. The lenslet 16 is spaced apart from the electronic laser scan transceiver chip 12 and is configured to alter the field of view of the electronic laser scan transceiver chip 12 compared to if the lenslet 16 is not present. A baffle 18 is disposed on the first substrate 14 and supports the lenslet 16 in a fixed relationship with respect the electronic laser scan transceiver chip 12. The baffle 18 is configured to provide structural stability for the lenslet 16. The baffle 18 may be also configured to absorb scatter from the laser pulse signal.

FIG. 2 provides an embodiment of a LIDAR system 10 that includes a matrix of antenna arrays 20. The matrix of antenna arrays 20 includes at least one antenna array 20. The antenna array 20 has at least two electronic laser scan transceiver chips 12 aligned along a common axis. FIG. 2 also shows the LIDAR system having a matrix of lenslets 24. The matrix of lenslets 24 include at least one lenslet array 26. Thus, the matrix of lenslets 24 include multiple antenna arrays 20 adjacent each other forming multiple rows and columns of lenslets 16. Each of the lenslet arrays 26 includes at least two lenslets 16. Each of the electronic laser scan transceiver chips 12 is disposed behind a lenslet 16. The number of electronic laser scan transceiver chip 12 can be equal to the number of lenslets 16.

For illustrative purposes, the LIDAR system 10 is shown having a matrix of antenna arrays 20 having three antenna arrays 22 wherein each of the antenna arrays has three electronic laser scan transceiver chips 12. Likewise, the LIDAR system is illustratively shown having a matrix of lenslets 24 having three lenslet arrays 26, each of the lenslet arrays include three lenslets 16. It should be appreciated that the number of electronic laser scan transceiver chip 12 and the number of lenslets 16 in a respective antenna array 20 and lenslet array 22 is not limiting.

Each of the lenslets 16 is configured to expand the field of view of a corresponding electronic laser scan transceiver chip 12. For example, the lenslets 16 may be configured to expand the field of view of a respective electronic laser scan transceiver chip 12 up to 130 degrees. The baffles 18 are shown segregating each electronic laser scan transceiver chip 12 from the other so as to compartmentalize individual electronic laser scan transceiver chips 12. The baffles 18 provide structure for which the lenslet array 22 may be mounted to as well as to absorb laser scatter so as to help reduce the occurrence of ghost lobes, thereby providing a more defined signal.

Figure 3:
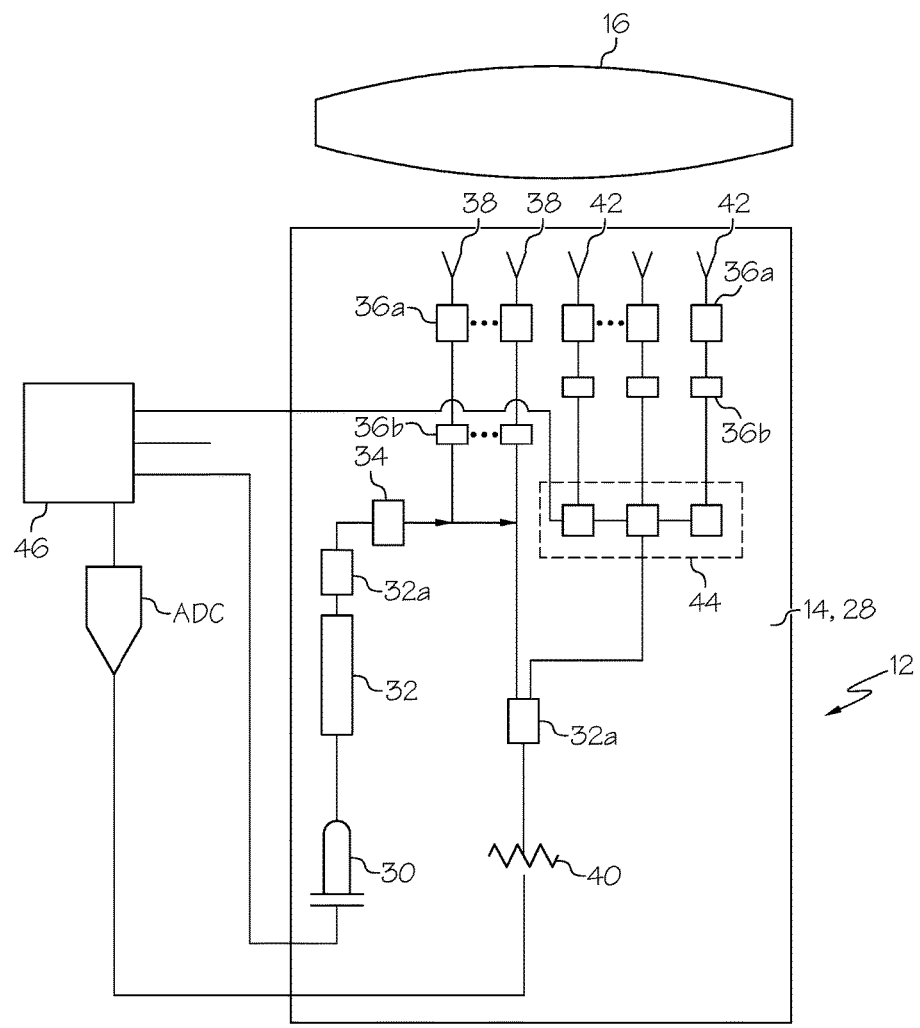
FIG. 3 illustrative schematic view of an electronic laser scan transceiver chip according to one or more embodiments described herein.

FIG. 3 is an illustrative schematic view of an embodiment of an electronic laser scan transceiver chip 12 adaptable for use in the LIDAR system 10. The electronic laser scan transceiver chip 12 may be printed on a dielectric circuit board 28 so as to form a printed circuit board. The electronic laser scan transceiver chip 12 includes a laser generating unit 30 configured to generate a laser beam. FIG. 3 shows an embodiment where the laser generating unit 30 is mounted onto the dielectric circuit board 28, but it should be appreciated that the laser generating unit 30 may be remotely located and electrically coupled to the electronic laser scan transceiver chip 12 via a conductive trace. The laser generating unit 30 may be laser diode, either multimode or single mode.

The laser beam is modified by a frequency tuner 32 so as to generate a consistent stream of laser beam pulses. The laser beam pulses are inputted into the feed lines 44 of the dielectric circuit board via a coupler 32a. The frequency tuner 32 may modify the laser beam to have a frequency between 54 k to 200 k pulses per second, and a wavelength based upon the application for which the LIDAR system 10 is designed. For instance, for meteorology, the wavelength may be infrared (1,542-200 nm). For terrestrial mapping or near object detection, the wavelength may be near-infrared (1044-1060 nm).

The electronic laser scan transceiver chip 12 further includes a scattering unit 34 configured to scatter the laser pulses. In one embodiment of a scattering unit 34, the scattering unit 34 is formed by conductive strips disposed on a dielectric substrate. The scattered laser pulses may be fed to an amplifier 36a and a phase shifter 36b for steering the laser beam. The laser beam transmitter antenna 38 configured to transmit the scattered laser pulses. The scatter laser pulses are passed through a respective lenslet 16. The scattered laser pulses are also fed to a photodetector 40 so as to process the time in which the laser beam is transmitted.

The electronic laser scan transceiver chip 12 is further configured to receive a receive beam. The receive beam is received by receive antennas 42. FIG. 3 shows a plurality of receive antennas 42 configured to receive a receive beam. The receive beam may be amplified by an amplifier 36a and a phase shifter 36b. The phase shifters 38 generate a phase shift for each receive beam. The receive beams are combined by a combiner network 44 and fed to the photodetector 40.

The photodetector 40 processes a differential in the time the laser beam was transmitted and received. The calculated differential is then transmitted to a computer processing unit 46 for image processing. The photodetector 40 may be a solid state photodetector such as silicon avalanche photodiodes or photomultipliers. It should be appreciated that the computer processing unit 46 may be configured to control the frequency tuner 32, scattering unit 34, amplifiers 36a, phase shifters 36b, photodetector 49 and combiner network 42 so as to transmit and receive laser beams for image processing.

With reference now to FIG. 4, a cross-sectional view of the LIDAR system 10 shown in FIG. 2 taken along lines 4-4 is provided. The first substrate 14 is planar and may be formed of a durable and rigid material configured to support the baffles 18 and the first substrate 14. The first substrate 14 may be thermally conductive so as to draw heat away from the electronic laser scan transceiver chip 12. Materials which may be used to form the first substrate 14 illustratively include crystalline silicon, silicon nitride, aluminum nitride, silicon nitride and the like. The first substrate 14 may be a wafer used for a printed circuit board 28.

The electronic laser scan transceiver chips 12 are mounted onto the first substrate 14. The electronic laser scan transceiver chip 12 may be fixed to the first substrate 14 using currently known or later developed techniques. For instance, the electronic laser scan transceiver chip 12 may be soldered onto the first substrate 14. The baffles 18 are disposed on the first substrate 14 and project outwardly from an outer surface of the first substrate 14. In another embodiment, the baffles 18 are integrally formed with the first substrate 14. In another embodiment, the baffles 18 extend through the first substrate 14.

The baffles 18 may be of different lengths so as to accommodate an arcuate arrangement of the lenslet array 22. For instance, it should be appreciated that the baffles 18 supporting opposing sides of the lenslet array 22 are shorter than the baffles 18 supporting the center of the lenslet array 22. The baffles 18 may be formed of a material having sufficient rigidity to support the weight of the lenslet array 22. Such material illustratively includes polypropylene, polycarbonate and the like. The material may be further coated so as to absorb laser scatter. For instance, the baffles 18 may have a black coating.

The lenslets 16 are shown mounted to the distal ends of the baffles 18 so as to be spaced a determined distance apart from a respective electronic laser scan transceiver chip 12 along a laser projection axis and in a direction generally transverse to the first substrate 14 thereby forming a gap therebetween. The lenslets 16 are spaced apart from a respective electronic laser scan transceiver chip 12 such that the light waves are combined to a focal point. Accordingly, it should be appreciated that the lengths of the baffles 18 are shown herein illustratively and may differ based upon the configuration of the electronic laser scan transceiver chip 12 and the lenslets 16.

The lenslets 16 may be formed of a clear plastic material having a refractive index of more than 1. Other material suitable for forming the lenslets 16 include silicon, silicon with silicon oxide, and dielectric materials such as silicon dioxide, silicon nitride, aluminum oxide, zirconium oxide and the like. The lenslets 16 may be aspherical so as to concentrate the light waves onto a single point. As used herein, aspherical refers to the outer contour of the lenslet 16 having a radius which varies. In such a manner, the focal point of the lenslet 16 may be designed to achieve a predetermined field of view. It should be appreciated that the shapes of the lenslets 16 are illustratively shown as being similar, but that the shapes of the individual lenslets 16 in the lenslet array 26 may differ from each other so as to achieve a desired field of view.

FIG. 4 is an illustrative example of an aspherical shaped lenslet 16. It should be appreciated that the shape is provided for illustrative purposes and is not limiting to the scope of the appended claims. For instance, in embodiments of a LIDAR system 10 having more than three electronic laser scan transceiver chips 12 the shape of the lenslets 16 may deviate from what is shown in FIG. 4 to change the field of view of the individual electronic laser scan transceiver chip 12. In particular, the field of view of each of the individual electronic laser scan transceiver chip 12 may be narrower than what is shown in FIG. 4, but the overall field of view of the LIDAR system 10 may remain the same as what is generally shown. It should be further appreciated that the field of view of an individual lenslet 16 and electronic laser scan transceiver chip 12 is narrower than the collective view of the antenna array 22 and lenslet array 26 as the field of view of each lenslet 16 and electronic laser scan transceiver chip 12 overlaps each other.

In another embodiment of a lenslet 16, the lenslet 16 is formed of a metamaterial 48. An example of such a lenslet 16 is illustratively shown in FIG. 5. The lenslet 16 includes a second substrate 50 formed of a first dielectric material 52. A plurality of particles 54 are embedded within the second substrate 50. The particles are generally indicated by dots embedded within the second substrate 50. However, it should be appreciated that the particles 54 may have different shapes so as to modify the field of view. For instance, the particles 54 may be cylindrical, square, irregular or oblong.

The particles 54 may be formed of a second dielectric material 56. The first dielectric material 52 is different than the second dielectric material 56. Dielectric material suitable for use in the lenslet 16 illustratively includes, but is not limited to, silicon dioxide, silicon nitride, aluminum oxide, zirconium oxide and the like. It should be appreciated that lenslets 16 formed of a metamaterial 48 includes the benefit of eliminating the need to shape the lenslet 16, e.g. forming an aspherical lens. For instance, the lenslet 16 may be a generally rectangular prism wherein the density of the particles, and location of the particles embedded within the first dielectric material 52 determines the focal point of the lenslet 16.

Figure 6:
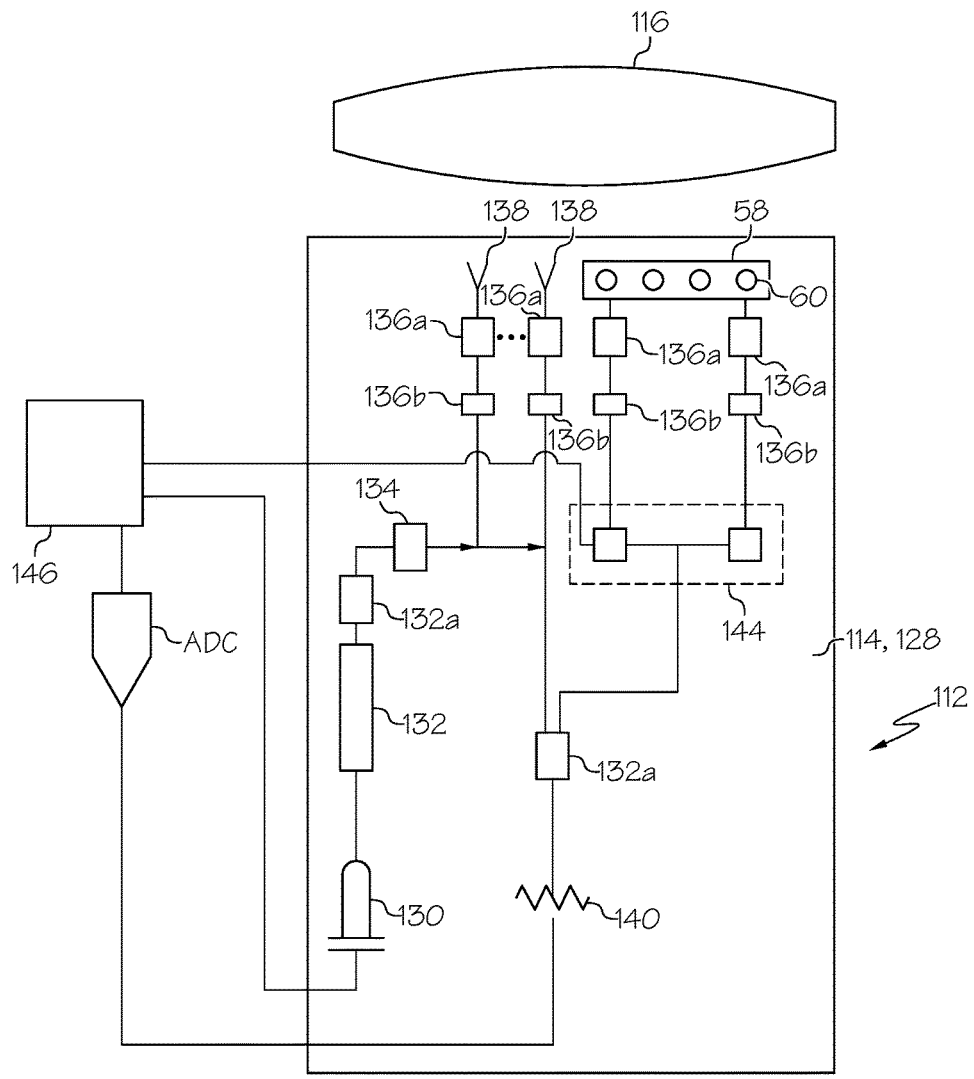
FIG. 6 one embodiment of a LIDAR system includes an electronic laser scan transceiver chip having an array of pixels.

With reference now to FIG. 6, one embodiment of a LIDAR system 110 is provided wherein like elements are referenced by like numbers increased by 100. The LIDAR system 110 includes an electronic laser scan transceiver chip 112 having an array of pixels 58. The electronic laser scan transceiver chip 112 may be printed on a dielectric circuit board 128. The electronic laser scan transceiver chip 112 includes a laser generating unit 130 configured to generate a laser beam. The laser generating unit 130 may be laser diode, either multimode or single mode.

The laser beam is modified by a frequency tuner 132 so as to generate a consistent stream of laser pulses. The laser pulse is inputted into the feed lines 144 of the dielectric circuit board via a coupler 132a. The frequency tuner 132 may modified the laser beam to have a frequency between 54 k to 200 k pulses per second, and a wavelength based upon the application. For instance, for meteorology, the wavelength may be infrared (1,542-200 nm). For terrestrial mapping or near object detection, the wavelength may be near-infrared (1044-1060 nm).

The electronic laser scan transceiver chip 112 further includes a scattering unit 134 configured to scatter the laser pulses. In one embodiment of a scattering unit 34, the scattering unit 134 is formed by conductive strips disposed on a dielectric substrate. The scattered laser pulses may be fed to an amplifier 136a and a phase shifter 136b for steering the laser beam. The laser beam transmitter antenna 138 configured to transmit the scattered laser pulses. The scatter laser pulses are passed through a respective lenslet 116. The scattered laser pulses are also fed to a photodetector 140 so as to process the time in which the laser beam is transmitted.

The electronic laser scan transceiver chip 112 is further configured to receive a receive beam from the scattered laser beam. The array of pixels 58 are disposed on the printed circuit board. The array of pixels 58 may be configured to process depth and the intensity of the receive beams. The array of pixels 58 includes a plurality of pixels 60. Each pixel 60 is further configured to record the time the laser flash pulse takes to travel into the scene and bounce back to the array of pixels 58, where each pixel 60 samples the incoming photon stream and "images" depth (3D) and location (2D), as well as reflective intensity. The depth, location and reflective intensity of the receive beams are processed to map the field of view.

With reference again to FIG. 4, an illustrative operation of the LIDAR system 10 is provided. The electronic laser scan transceiver chip 12 are powered, wherein the computer processing unit 40 actuates each of the electronic laser scan transceiver chip 12. The laser pulse is generated and transmitted through the transmitter antenna 38 wherein the laser pulse is transmitted with a field of view between 20 to 30 degrees. The laser pulse is passed through the respective lens of the lenslet array 22 wherein the field of view is widened. In particular, the lenslets 16 are configured to change the angle of the field of view, as well as widen the field of view of the laser pulse. FIG. 4 shows the center electronic laser scan transceiver chip 12 having a field of view of generally fifty degrees and centered along an axis perpendicular to the planar surface of the first substrate 14.

FIG. 4 also illustrates how the lenslets 16 on the outer edges of the lenslet array 22 are angled with respect to the center lenslet 16. In particular, the baffles 18 supporting the outer lenslets 16 are shorter than the baffles 18 supporting the center of the lenslet array 22. FIG. 4 illustrates how the overall field of view of the LIDAR system 10 is widened by having the lenslets 16 angled. It should be appreciated that the lenslets 16 on the outer edges of the lenslet array 22 are illustratively shown to have a field of view similar to the lenslets 16 in the center of the lenslet array 22. FIG. 4 depicts an embodiment of the LIDAR system 10 wherein the lenslets 16 of the lenslet array 22 are identical to each other, but angled differently to achieve a wider field of view relative to a lenslet array 22 of lenslets 22 having a planar orientation. In particular, FIG. 4 illustrates the lenslet array 22 having a generally convex surface. It should be appreciated that the embodiment set forth in FIG. 4 is illustrative and not limiting to the scope of the appended claims. It should be further appreciated that the overall field of view of the LIDAR system 10 shown in FIG. 4 is similar to the field of view of the prior art LIDAR system shown in FIG. 1, but without the complexity of coupling individual substrates together at an angle.

Figure 5:
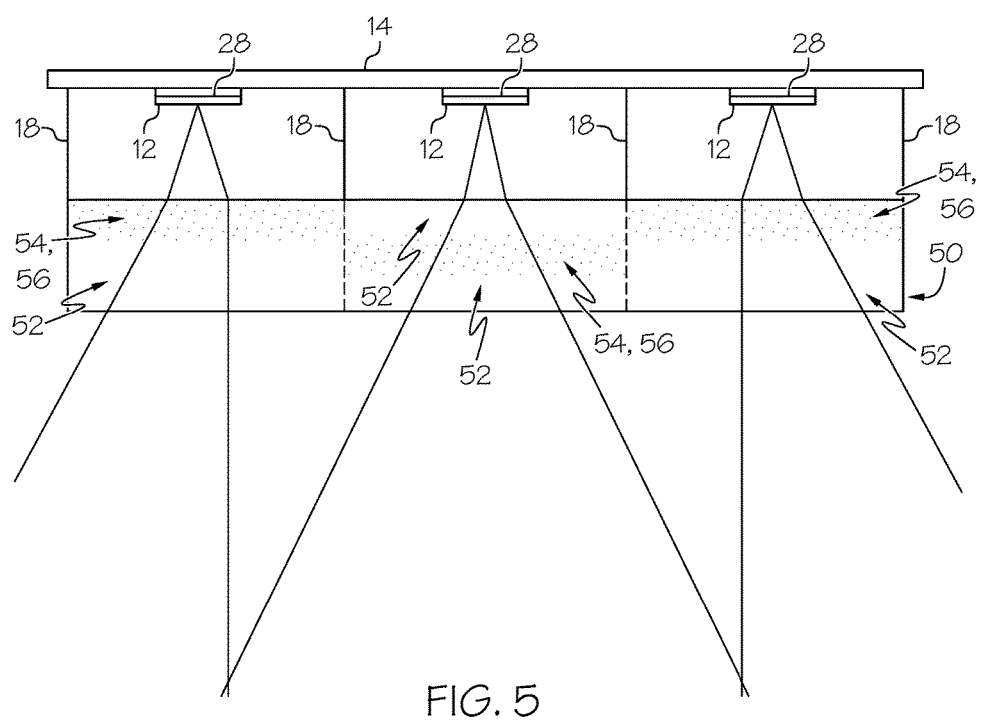
FIG. 5 is a cross-sectional view of a LIDAR system according to one or more embodiments described herein wherein the lenslet is formed of a metamaterial.

With reference again to FIG. 5, an illustrative operation of the LIDAR system 10 having a lenslet array 22 having lenslets 16 formed of a metamaterial 48 is provided. FIG. 5 also illustrates how a lenslet 16 formed of a metamaterial 48 may have a generally planar outer surface but still configured to widen the view of the LIDAR system 10. In such a case, the metamaterial 48 includes a second substrate 50 formed of a first dielectric material 52. The metamaterial 48 includes a plurality of particles 54 embedded within the second substrate 50. The particles 54 are formed of a second dielectric material 56. It should be further appreciated that the overall field of view of the LIDAR system 10 shown in FIG. 4 is similar to the field of view of the prior art LIDAR system shown in FIG. 1, but without the complexity of coupling individual substrates together at an angle. Additionally, the manufacturing of a LIDAR system 10 shown in FIG. 5 is relatively simpler than the LIDAR system 10 shown in FIG. 4 in that the baffles 18 are of equal length.

Each lenslet 16 may be configured to have a different field of view by altering the pattern of embedded particles 54 of the second dielectric material 56, the shape of the particles 54 or a combination of both. In such a manner, the field of view of the outer lenslets 16 may be angled outwardly with respect to the center of the lenslet array 22 so as to widen the field of view. In such an embodiment, the baffles 18 are similar in physical dimension. Namely, the length of each of the baffles 18 are the same so as to space the planar lenslet array 22 evenly apart from the first substrate 14 upon which the electronic laser scan transceiver chip 12 are disposed. The baffles 18 not only provide structural support for the lenslet array 22, but also absorbed scatter from the laser pulse so as to help reduce ghost lobes.

Figure 7:
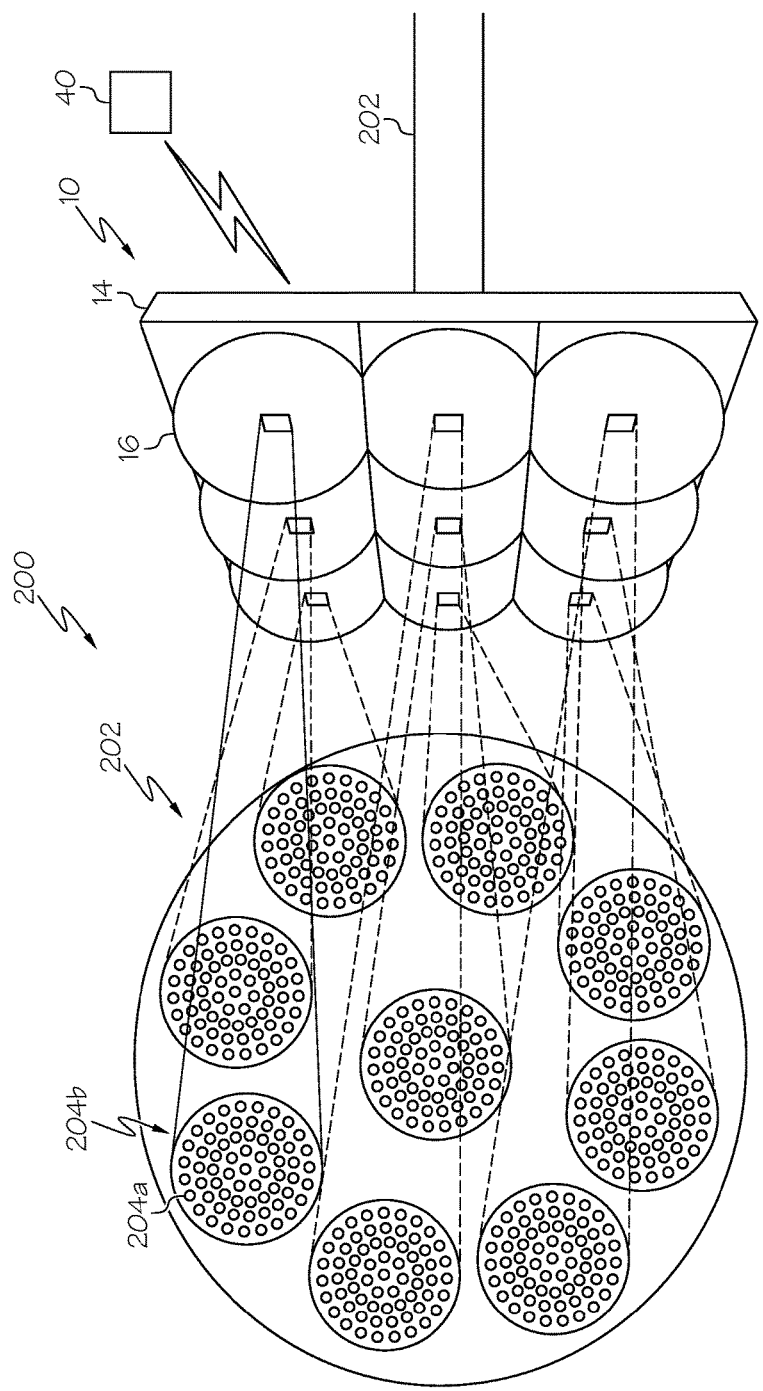
FIG. 7 schematically depicts an embodiment of the LIDAR system for use in a communications system.

The LIDAR system 10 may be used to map a field of view. The map information may be processed for various automotive applications to include autonomous driving, adaptive braking or the like. However, it should be appreciated that the LIDAR system 10 adapted for use in various applications. FIG. 7 shows an embodiment of the LIDAR system 10 for use in a communications system 200.

The communication system 200 may be configured to transmit and receive digital information between an input fiber optic cable 202 and a bundle 204 of fiber optic cables 202. In one embodiment of a communication system 200, the LIDAR system 10 is electrically coupled to the input fiber optic cable 202. The receiving bundle 204 includes a plurality of fiber optic cables 204a bunched together in a group 204b. The fiber optic cables 202, 204a are configured to carry light waves. Data may be carried by the light waves. In the instance case, the light waves are laser beams.

The fiber optic cables 202, 204a may be used to provide a high-speed data connection between different locations. Yet, as is known in fiber optic technology, the bandwidth is not unlimited. Accordingly, the LIDAR system 10 may be adapted to direct data between the groups of fiber optic cables 204a within the receiving bundle 204 so as to facilitate data transfer at the maximum bandwidth available. In one embodiment, each electronic laser scan transceiver chip 12 is assigned a group 204b of fiber optic cables 204a.

FIG. 7 shows the electronic laser scan transceiver chip 12 electrically coupled to the input fiber optic cable 202. The input fiber optic cable 202 is configured to transmit digital signals to the receiving bundle 204 of fiber optic cables 204a over a laser beam. The digital signal may be inputted onto the feed lines 44 of the electronic laser scan transceiver chip 12 wherein the digital signal is carried by the laser beam pulse and transmitted through a respective electronic laser scan transceiver chip 12 to a predetermined group 204b of fiber optic cables 204a.

The computer processing unit 40 is configured to selectively actuate electronic laser scan transceiver chip 12 based upon the amount of data being inputted into a respective group 204b so as to distribute the data. By selectively actuating the electronic laser scan transceiver chips 12. The electronic laser scan transceiver chips 12 transmit the laser pulse through a respective lenslet 16. The lenslets 16 are configured to direct the laser beam transmission to an assigned group 204b of fiber optic cables 204a. Accordingly, the laser pulse beam, and data which the laser pulse beam carries, the LIDAR system 10 is able to ensure that data transfer does not exceed the bandwidth of individual fiber optic cables 204a. Further, it should be appreciated that the lenslet array 22 provides a widened field of view of the electronic laser scan transceiver chip 12 so as to accommodate a receiving bundle 204 of fiber optic cables relative to LIDAR systems 10 without the lenslet array 22. Further, as the electronic laser scan transceiver chip 12 is printed on a printed circuit board, the LIDAR system 10 does not require the packaging space of LIDAR assembly with rotating polygon mirrors, thus making the assembly of the LIDAR system 10 compatible for use in commercial office buildings.

Accordingly, LIDAR systems 10, 110 are described which simplify the manufacturing process for widening the field of view of the LIDAR system by eliminating the need to couple the electronic laser scan transceiver chips 12 at an angle relative to each other. Further, the LIDAR systems 10, 110 described herein help reduce the signature of ghost lobes as laser beam scatter is absorbed by baffles. Further, the LIDAR systems 10, 110 described herein include baffles which provide structural support and rigidity to the LIDAR system 10, 110. Further, the LIDAR system 10, 110 described herein may be utilized in applications where packaging space is limited so as to facilitate and enhance object detection systems such as autonomous driving, object avoidance or braking. It should be further appreciated that the LIDAR systems 10, 110 described herein may be used in various applications in which bandwidth constrains data transfer and in which packaging space limits the use of conventional systems such as rotating polygon mirrors.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A LIDAR system comprising:
   a substrate;
   an array of electronic laser scan transceiver chips mounted to the substrate, the array of electronic laser scan transceiver chips comprising:
   a first electronic laser scan transceiver chip comprising a first photodetector and a first laser generating unit, wherein the first electronic laser scan transceiver chip is configured to scan a first laser beam within a first field of view; and
   a second electronic laser scan transceiver chip comprising a second photodetector and a second laser generating unit, wherein the second electronic laser scan transceiver chip is configured to scan a second laser beam within a second field of view;
   a lenslet array comprising:
   a first lenslet spaced apart from the first electronic laser scan transceiver chip and configured to increase the first field of view within which the first laser beam of the first electronic laser scan transceiver chip is scanned; and
   a second lenslet spaced apart from the second electronic laser scan transceiver chip and configured to increase the second field of view within which the second electronic laser beam of the second laser scan transceiver chip is scanned; and
   a baffle extending between: (i) the first electronic laser scan transceiver chip and the first lenslet; and (ii) the second electronic laser scan transceiver chip and the second lenslet, so as to separate the first electronic laser scan transceiver chip and the first lenslet from the second electronic laser scan transceiver chip and the second lenslet.

2. The LIDAR system of claim 1, wherein each of the first lenslet and the second lenslet are aspherical.

3. The LIDAR system of claim 1, wherein the baffle is configured to absorb a light wave so as to reduce scatter.

4. The LIDAR system of claim 1, wherein the first lenslet and the second lenslet are lenslets in a a matrix of lenslets having rows and columns of lenslets substantially similar to the first lenslet and the second lenslet and the first electronic laser scan transceiver chip and the second electronic laser scan transceiver chip are electronic laser scan transceiver chips in an array of electronic laser scan transceiver chips that are each substantially similar to the first electronic laser scan transceiver chip and the second electronic laser scan transceiver chip and form a matrix of electronic laser scan transceiver chips having rows and columns of electronic laser scan transceiver chips.

5. The LIDAR system of claim 4, wherein each electronic laser scan transceiver chip in the array of electronic laser scan transceiver chips corresponds to one of the lenslets in the matrix of lenslets, and the number of electronic laser scan transceiver chips is equal to the number of lenslets mounted to the substrate.

6. The LIDAR system of claim 1, wherein each of the lenslets is formed of a clear plastic.

7. The LIDAR system of claim 1, wherein each of the lenslets has a refractive index greater than 1.

8. The LIDAR system of claim 1, wherein the lenslet array has an arcuate profile.

9. The LIDAR system of claim 1, wherein the lenslets are formed of a metamaterial.

10. The LIDAR system of claim 9, wherein the lenslet array comprises a first substrate and a second substrate and the first substrate is formed by a first dielectric material, and the second substrate includes a plurality of particles, and the plurality of particles are formed of a second dielectric material, and the first dielectric material is different than the second dielectric material.

11. The LIDAR system of claim 1, wherein the substrate is planar.

12. A LIDAR system comprising:
a substrate having a planar surface;
a first electronic laser scan transceiver chip and a second electronic laser scan transceiver chip mounted to the substrate, the first electronic laser scan transceiver chip and the second electronic laser scan transceiver chip each comprising a photodetector and a laser generating unit, wherein each of the first electronic laser scan transceiver chip and the second electronic laser scan transceiver chip is configured to scan a laser beam within a field of view;
a first lenslet spaced apart from the first electronic laser scan transceiver chip and configured to increase the field of view of the laser beam generated by the first electronic laser scan transceiver chip and a second lenslet spaced apart from the second electronic laser scan transceiver chip and configured to increase the field of view of the laser beam generated by the second electronic laser scan transceiver chip; and
baffle extending between (i) the first electronic laser scan transceiver chip and the first lenslet and (ii) the second electronic laser scan transceiver chip and the second lenslet so as to separate the first electronic laser scan transceiver chip and the first lenslet from the second electronic laser scan transceiver chip and the second lenslet.

13. The LIDAR system of claim 12, wherein the each of the first lenslet and the second lenslet are aspherical.

14. The LIDAR system of claim 12, wherein the baffle is configured to absorb a light wave so as to reduce scatter.

15. The LIDAR system of claim 12, wherein the first lenslet and the second lenslet are formed of a metamaterial.

16. A communication network, the communication network comprising:
an input fiber optic cable configured to carry signal;
a receiving bundle, the receiving bundle having a plurality of fiber optic cables configured to carry the signal; and
a lidar system, the lidar system having:
a substrate,
a laser generating unit configured to generate a laser;
an array of electronic laser scan transceiver chips mounted to the substrate, the array of electronic laser scan transceiver chips having a predetermined number of electronic laser scan transceiver chips,
a lenslet array spaced apart from the array of electronic laser scan transceiver chips so as to increase a field of view of the array of electronic laser scan transceiver chips, the lenslet array having a predetermined number of lenslets, and
a plurality of baffles, each of the plurality of baffles extending between the array of electronic laser scan transceiver chips and the lenslet array so as to separate each of the predetermined number of electronic laser scan transceiver chips and the lenslet array from each other, wherein
the lidar system is configured to receive a signal from the input fiber optic cable and transmit the signal received from the input fiber optic cable to the receiving bundle using the laser generating unit, wherein the lidar system is further configured to actuate the array of electronic laser scan transceiver chips so as to selectively direct the signal to a fiber optic cable in the receiving bundle.

17. The communication network as set forth in claim 16, wherein each of the predetermined number of lenslets are aspherical.

18. The communication network as set form in claim 16, wherein each of the plurality of baffles are configured to absorb the signal so as to reduce scatter.

19. The communication network of claim 16, wherein the lenslet array comprises a matrix of lenslets and wherein the array of electronic laser scan transceiver chips comprises a matrix of electronic laser scan transceiver chips.

20. The communication network of claim 16, wherein each of the predetermined number of lenslets is formed of a first metamaterial, and the first metamaterial includes a second substrate embedded with a plurality of particles formed of a second dielectric material.

* * * * *